US007246106B2

United States Patent
Gaynor et al.

(10) Patent No.: US 7,246,106 B2
(45) Date of Patent: Jul. 17, 2007

(54) SYSTEM AND METHOD FOR DISTRIBUTING ELECTRONIC INFORMATION

(75) Inventors: Michael G. Gaynor, Chicago, IL (US); Scott Waterbury, Wilmette, IL (US)

(73) Assignee: Red Paper LLC, Chicago, IL (US)

( * ) Notice: Subject to any disclaimer, the term of this patent is extended or adjusted under 35 U.S.C. 154(b) by 428 days.

(21) Appl. No.: 10/612,653

(22) Filed: Jul. 2, 2003

(65) Prior Publication Data

US 2005/0004808 A1 Jan. 6, 2005

(51) Int. Cl.
*G06F 7/00* (2006.01)
*G06Q 30/00* (2006.01)
*G06Q 20/00* (2006.01)

(52) U.S. Cl. .................... 707/1; 707/3; 707/9; 707/10; 705/1; 705/17; 705/26

(58) Field of Classification Search .................. 707/1; 705/1, 26
See application file for complete search history.

(56) References Cited

U.S. PATENT DOCUMENTS

| 4,996,642 | A | | 2/1991 | Hey |
| 5,583,763 | A | | 12/1996 | Atcheson et al. |
| 5,629,980 | A | * | 5/1997 | Stefik et al. ................... 705/54 |
| 5,634,012 | A | | 5/1997 | Stefik et al. |
| 5,974,396 | A | | 10/1999 | Anderson et al. |
| 6,016,509 | A | | 1/2000 | Dedrick |
| 6,064,980 | A | | 5/2000 | Jacobi et al. |
| 6,078,916 | A | | 6/2000 | Cullis |
| 6,112,186 | A | | 8/2000 | Bergh et al. |
| 6,195,646 | B1 | | 2/2001 | Grosh et al. |
| 6,260,064 | B1 | | 7/2001 | Kurzrok |
| 6,266,649 | B1 | | 7/2001 | Linden et al. |
| 6,317,722 | B1 | | 11/2001 | Jacobi et al. |
| 6,334,127 | B1 | | 12/2001 | Bieganski et al. |
| 6,356,879 | B2 | | 3/2002 | Aggarwal et al. |
| 2001/0044759 | A1 | | 11/2001 | Kutsumi et al. |
| 2001/0047290 | A1 | | 11/2001 | Petras et al. |
| 2002/0059240 | A1 | | 5/2002 | Hollenbeck et al. |
| 2002/0065797 | A1 | | 5/2002 | Meidan et al. |
| 2002/0161664 | A1 | | 10/2002 | Shaya et al. |
| 2002/0169688 | A1 | | 11/2002 | Kasai |
| 2002/0178057 | A1 | | 11/2002 | Bertram et al. |
| 2002/0178082 | A1 | | 11/2002 | Krause et al. |
| 2002/0194607 | A1 | | 12/2002 | Connelly |
| 2003/0004855 | A1 | | 1/2003 | Dutta et al. |
| 2003/0005428 | A1 | | 1/2003 | Roman |
| 2003/0028469 | A1 | | 2/2003 | Bergman et al. |
| 2003/0088554 | A1 | | 5/2003 | Ryan et al. |
| 2003/0105682 | A1 | | 6/2003 | Dicker et al. |

FOREIGN PATENT DOCUMENTS

EP 1255213 A2 * 11/2002

* cited by examiner

*Primary Examiner*—Don Wong
*Assistant Examiner*—Helene Rose
(74) *Attorney, Agent, or Firm*—James P. Muraff; Neal, Gerber & Eisenberg LLP

(57) ABSTRACT

A system and method for distributing a plurality of electronic articles is provided. Articles are received from a plurality of users and stored retrievably in memory. A request is received for the purchase of an article from one of a plurality of users. An electronic funding account associated with the one of a plurality of users is debited, and the article is transmitted to the one of the plurality of users.

19 Claims, 6 Drawing Sheets

FIGURE 7

700 red Media By The People
Wednesday, May 21, 2003
Go to My Column
[_____] Go
Enter Pen Name and click GO Quick Search [_____] Go   Advanced Search   Sign Up   Login   My RedPaper   The RedPaper Cafe

NEWS & COMMENTARY

World
U.S.
Local News
Business
Technology 780
Politics
Law
Health
Culture
Sports

ADVICE & INSTRUCTION

Business Advice
Personal Finance
Travel
Health & Fitness
Dining Out
Arts Reviews
Home & Garden
Religion
Marriage & Family
On The Job
Hobbies & Crafts

CREATIVE WORKS

News Spoofs
Fiction
Non-fiction
Poetry
Music
Films
Mature Content

Top Story Goes Here — 710
By Username — 720
Posted 06/20/2003 12:52 am — 730
Rating: 1240/60/22 — 760
740 / 750

The description of the top story goes here. The description of the top story goes here. The description of the top story goes here. The description of the top story goes here. The description of the top story goes here. The description of the top story goes here. The descrip-

About RedPaper
RedPaper is media for the people, by the people. More about RedPaper goes here.

How to purchase articles
Simply click the title of the article and select the buy button. More instructions go here.

How to sell articles
Register with RedPaper, post your article, and continue. More about how to sell media goes here.

Top Sellers 770
News & Commentary

| Title | Author | Posted | Rating |
|---|---|---|---|
| News Story Goes Here - 710 | Username | 1 hr 2 min | 1240/60/22 |
| News Story Goes Here  720 | Username | 1 hr 6 min | 1240/60/22 |
| News Story Goes Here | Username | 15 min | 1240/60/22 |

770   740

Advice & Instruction

| Title | Author | Posted | Rating |
|---|---|---|---|
| Advice Stories go here - 710 | Username | 1 hr 2 min | 1240/60/22 |
| Advice Stories go here  720 | Username | 1 hr 6 min | 1240/60/22 |
| Advice Stories go here | Username | 15 min | 1240/60/22 |

770    750

Creative Works —

| Title | Author | Posted | Rating |
|---|---|---|---|
| Creative Works Stories go here | Username | 1 hr 2 min | 1240/60/22 |
| Creative Works Stories go here | Username | 1 hr 6 min | 1240/60/22 |
| Creative Works Stories go here | Username | 15 min | 1240/60/22 |

760

Most Recently Posted Articles

| Title | Category | Author | Posted | Rating |
|---|---|---|---|---|
| Latest Stories go here | News & Commentary | Username | 39 seconds | 1234/88/542 |
| Latest Stories go here | Advice & Instruction | Username | 45 seconds | 898/472/92 |
| Latest Stories go here | Advice & Instruction | Username | 1:12 min. | 898/472/92 |
| Latest Stories go here | Creative Works | Username | 1:13 min. | 898/472/92 |

Ask Scoop
Scoop is here to provide assistance and support for your RedPaper adventures.

Click here to Ask Scoop.

Happy Scooping

Company Store

16 oz. coffee mug
$9.99

Scoop Hat
All sizes
$9.99

Scoop Mouse pad
$9.99

Scoop Pen
Refillable
$9.99

Scoop Scoop
$9.99

Advanced Search | Sign Up | My RedPaper | Contact Us | About Us
Post A Story | The RedPaper Cafe PayPal © 2003 RedPaper Inc.

SYSTEM AND METHOD FOR DISTRIBUTING ELECTRONIC INFORMATION

FIELD OF THE INVENTION

The present invention relates to an electronic marketplace. More particularly, the present invention relates to a system and method for distributing electronic information.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., a Web server or Web site) to send graphical Web pages of information to a remote client computer system. The remote client computer system can then display the Web pages on a display screen such as a cathode ray tube ("CRT") or the like. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages on a display screen.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

An important feature of the WWW is the ability to connect one Web page to many other Web pages using "hypertext" links. A link typically appears unobtrusively as an underlined portion of text in a Web page; when the user of this page moves a pointer over the underlined text and clicks, the link—which is otherwise invisible to the user—is executed and the linked Web page is retrieved. It is also not necessary for the retrieved Web page to be located on the same server as the original Web page.

One of the benefits of the WWW is the accessibility of information. Thus, the WWW has become increasingly used to share electronic information between users of the Internet. Similarly, the widespread accessibility and ease of use of the WWW have enabled it to contribute significantly to the growth of electronic commerce.

Web sites offering electronic information to WWW users generally fall into two types, the first of which is a "one-to-many" information distribution system. Electronic information—for example, news articles, short stories, poems, recipes, sports news, computer files, product recommendations, and instructions—are provided on a Web site for distribution to multiple users. Such electronic information may generally be referred to as "articles". In such "one-to-many" systems, the content of the articles is generated by a single entity, e.g. a newspaper, and available to multiple users. For example, the Web site NYTIMES.COM utilizes a "one-to-many" electronic information distribution system. However, "one-to-many" systems typically do not provide for users of the Web site to communicate with other users of the Web site.

By way of example of a "one-to-many" information distribution system, U.S. Pat. No. 6,078,916 to Culliss on Jun. 20, 2000 discloses a method of organizing information in which the search activity of a user is monitored and such search activity is used to organize articles in a subsequent search.

A second type of Web sites offering electronic information is a "many-to-many" information distribution system. In this type of system, articles are not created by a single entity but rather are created by multiple users and subsequently made available to multiple other users of the Web site. Thus, the "many-to-many" Web site operates as a central point of information sharing between the multiple users of the Web site. For example, the Web site BLOGGER.COM utilizes a "many-to-many" electronic information distribution system. However, "many-to-many" systems typically do not provide incentive, financial or otherwise, for information-providing users to provide information to the Web site; such systems rely on the voluntary provision of information from users. Also, "many-to-many" systems typically do not provide a mechanism by which information-seeking users may gauge the value of the information provided by other users.

Exemplary of a "many-to-many" information distribution system is U.S. Patent Application Publication No. 2003/0028469 A1 of Bergman et al. on Feb. 6, 2003, which discloses techniques for enabling an electronic information marketplace between buyers and sellers exchanging information goods.

The present invention is provided to solve these and other problems.

SUMMARY OF THE INVENTION

The present invention provides a system in which users sell and buy electronic articles that contain electronic information, from many sellers to many buyers in a secure and anonymous market. The system utilizes a rating system and a "mini-pricing" cost structure.

A system and method for distribution of a plurality of electronic articles is disclosed in which users provide electronic information, for example, stories, recipes, reviews, poems, news, hobby-related information, instructions, and other information to the system. In one embodiment of the present invention, the articles are stored in a memory and are thereafter retrievable from the memory. The users of the system are each associated with an electronic funding account. The system receives a request for the purchase of an article from one of the users of the system, and the cost of the article is debited from the electronic funding account associated with the user requesting the purchase. The system then transmits the article to the user who purchased the article.

In another embodiment of the present invention, a system and method for distributing a plurality of electronic articles is disclosed in which each article is associated with at least one piece of other information, for example, type, subject matter, author name, submitter name, title, and date. The articles are received from the information-providing users of the system and are retrievably stored in a memory. The articles are ranked by the system by the at least one piece of information associated with the article, thus enabling users of the system to gauge the value of an article before submitting a purchase request for the article.

In yet another embodiment of the present invention, a system and method for distributing a plurality of electronic articles is disclosed in which the users of a Web site may purchase articles which have been provided to the Web site by other users, and may rate the value of the articles they have purchased. The Web site may record this information, and the ranking of the rated article may be adjusted to reflect the rating provided by the user-purchaser of the article, thus, in this embodiment, enabling users to determine how other users have rated the article.

In yet another embodiment of the present invention, a system and method for distributing a plurality of electronic articles is disclosed in which the content of a Web site is generated based on the articles which have been submitted to the Web site. For example, the Web site may display the day's highest-ranked article, or may display the highest-ranked articles within each type of article, or may display the most recently submitted articles. Thus, in this embodiment, the content of the Web site is dependent on the articles submitted to the Web site and the rankings of those articles.

Other features and advantages of the invention will be apparent from the following specification taken in conjunction with the following drawings.

BRIEF DESCRIPTION OF THE DRAWINGS

FIG. 7 is an illustration of a page of a Web site in which information related to articles on the system is displayed to the viewer of the Web site, in which the content of the Web page has been generated based on the information about the articles on the system, in accordance with one embodiment of the present invention.

DETAILED DESCRIPTION OF THE DRAWINGS

Figure 1:
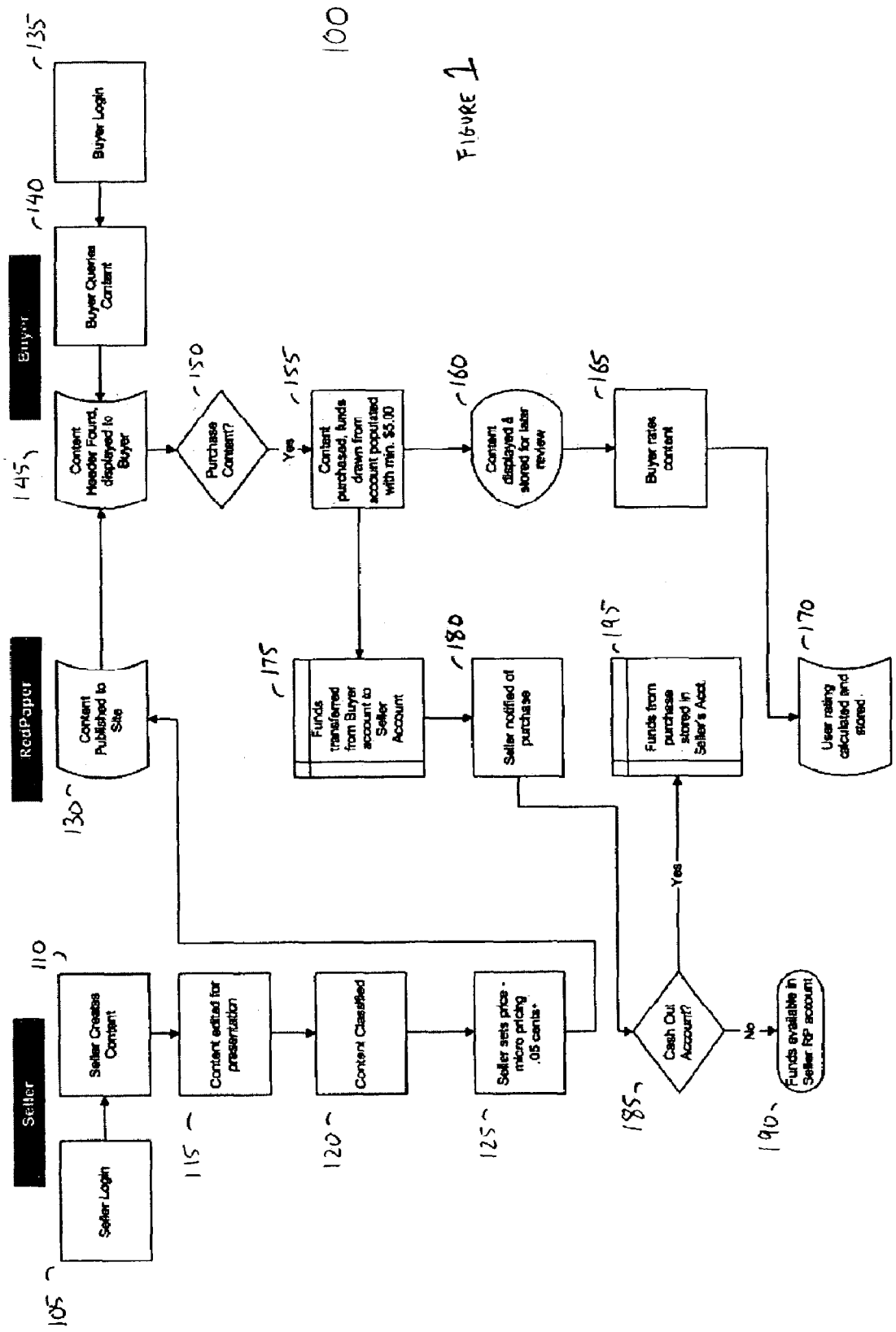
FIG. 1 is the primary flowchart of the system and method for distributing a plurality of electronic articles, illustrating the interaction between the system and its buying and selling users.

While this invention is susceptible of embodiment in many different forms, there are shown in the drawings and herein described in detail preferred embodiments with the understanding that the present disclosure is to be considered an exemplification of the principles of the invention and is not intended to limit the broad aspect of the invention to the embodiments illustrated.

Referring in detail to the drawings and initially to FIG. 1, there is provided a system and method for distributing a plurality of electronic articles. Users of the system are of two types: buyers and sellers. The seller logs on to the system in step 105, and in step 110 enters the content of the article to be posted and sold on the system. The seller may be required to log on to the system in step 105 prior to the entry of the content of the article in step 110, or may be permitted to enter content in step 110 before logging on in step 105; the principles of the present invention are practicable in either embodiment. In step 115 the seller may optionally edit the content of the article, making revisions to the content before finally submitting the article to the system. In step 120, the content of the article is classified as being of a certain type, for example, "short story". The classification of the article in step 120 may be made by the seller, or may be automatically made by the system upon a scan of the text of the article; the principles of the present invention may be practiced in either embodiment.

In step 125, the price of the article is established. The seller may set his or her own price for the article in step 125, or the price of the article may be established by the system; the principles of the present invention are practicable in either embodiment. If established by the system, the price of the article may be based on, for example, the length of the article, the category of the article, the date of submission of the article, or the identity of the author of the article; all such embodiments are practicable within the principles of the present invention. Additionally, the price of every article on the system may be equal to every other article. Additionally, the price of every article or of some articles on the system may be zero. After the price is established in step 125, the article is stored in the system in step 130. One skilled in the art will appreciate the variety of ways in which an electronic article may be stored electronically. Such storage options include, for example, a database, a linked-list, a node storage system, a tree data structure, or an index-based storage system.

The second type of user of the system, the buyer, logs into the system in step 135. The buyer may either be required to log onto the system, or may be able to browse the system before logging on; the principles of the present invention are practicable in either embodiment. The buyer may optionally enter a search query in step 140 to search for articles on the system. The system retrieves articles meeting the search query and displays summaries of the results of the search in step 145. In step 145, articles are not displayed in their entirety; only a summary of the article is displayed for the buyer's perusal. The summary of the article acts as a digest to aid the buyer in determining whether to purchase the article. The summary may be entered by the seller in 115 or 120, or may be automatically prepared by the system by, for example, displaying only the first several sentences or paragraphs of the article as a summary; the principles of the present invention are practicable in either embodiment.

The buyer may then, in step 150, purchase one or more articles. If the buyer does not purchase any articles, the buyer may return to enter a different search query in step 140, or may return to the home Web page of the system in step 135. If the buyer chooses to purchase one or more articles, the system debits the cost of the one or more articles from the buyer's electronic funding account in step 155. One skilled in the art will appreciate the variety of electronic funding account systems which are practicable in accordance with the present invention. Preferably, the system features an electronic deposit account in which the user must deposit funds before becoming able to purchase an article. Preferably, the prices of articles are established in micro-pricing increments of, for example, $0.05.

After the funds are debited from the buyer's account in step 155, the system performs two steps in parallel. First, funds are deposited into the seller's electronic funding account as illustrated in step 175. Second, the purchased article is transmitted to the user in step 160. The article may be displayed on a Web site or other visual display, or may be electronically mailed to the buyer, or may be made available for electronic download by the buyer. The principles of the present invention are practicable in all such embodiments.

After the purchase of the article, the buyer may provide data about the article in step 165. In one embodiment of the present invention, the buyer may provide rating information about the article; for example, the buyer may score the article on a positive scale of 0-100. In another embodiment of the present invention, the buyer may enter textual comments about the article which may be stored in the system. These buyer-provided comments may later be displayed to other users or may be transmitted to the seller of the article. In step 170, the rating and/or other data provided by the buyer of the article is stored in the system. Buyer-provided rating data may be required or may be optional; the principles of the present invention are practicable in either embodiment.

After the deposit of money into the seller's account in step 175, the seller may be notified of the purchase of the article in step 180. The notification of the purchase of the article may take the form of a posting to a Web site, or may be electronically mailed to the seller; the principles of the present invention are practicable in either embodiment. In step 185, the seller may "cash out" (i.e., withdraw from) his or her account. If the seller chooses to withdraw his or her earnings, the funds are transferred and thereafter available in an account for the seller in step 190. The cash-out account may be in the form of a check written to the seller, or may be made to an electronic debit, checking, or credit account; the principles of the present invention are practicable in either of these embodiments. If the seller does not choose to withdraw from the account, the earnings from the purchase of the article are stored in the seller's electronic funding account in step 195.

Figure 2:
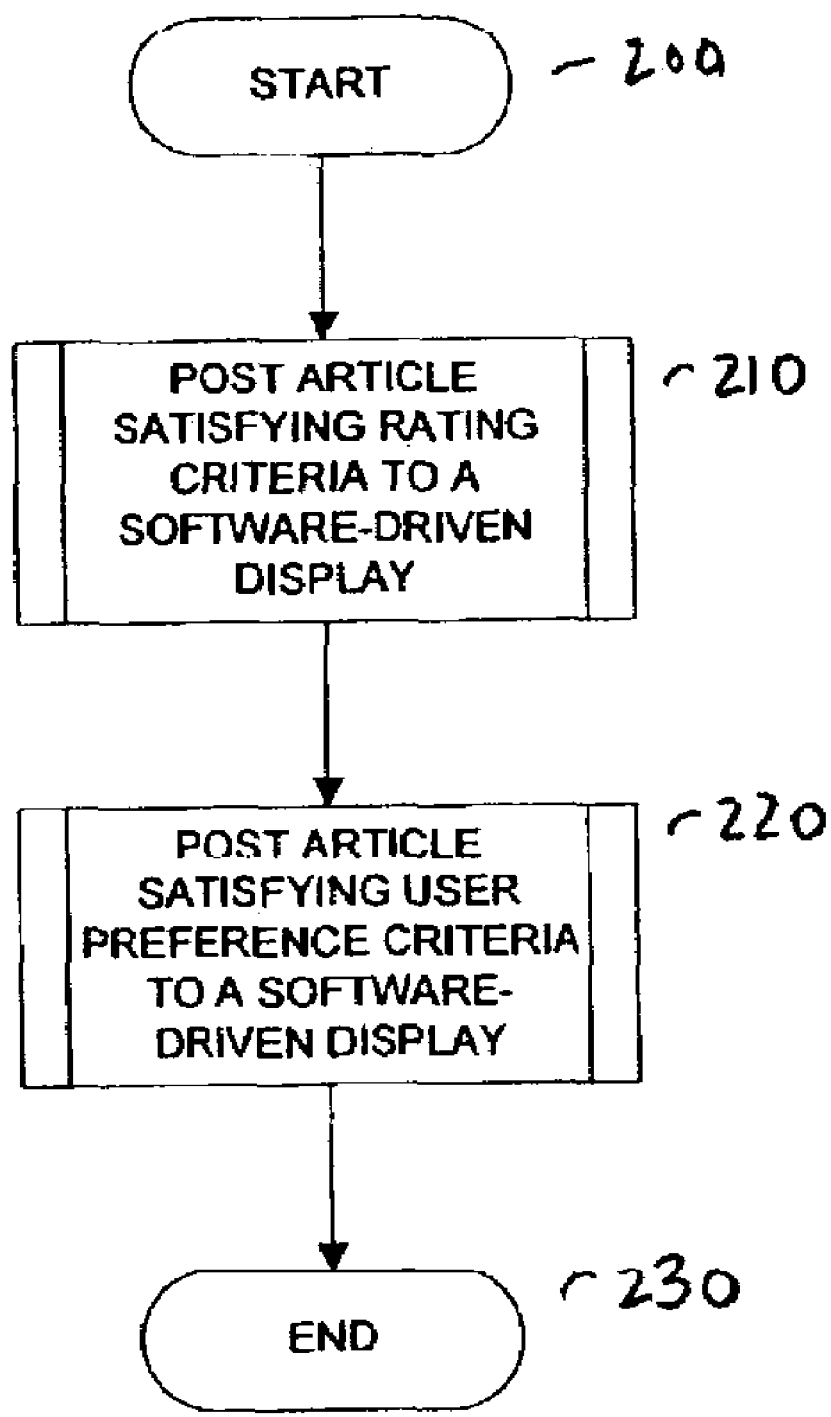
FIG. 2 is a flowchart of a portion of the system and method for distributing electronic articles related to selecting an article based on rating criteria and then posting that article to a software-driven display in accordance with one embodiment of the present invention.

FIG. 2 further details a method for selecting and posting information in accordance with one embodiment of the present invention. The method begins at step 200 and continues to step 210, wherein the system posts information satisfying rating criteria to a software-driven display. While the rating criteria for selecting the information could be of many different types, examples include articles ranked above or below a certain average rating level. In the next step 220, the system posts information to a software-driven display selected in accordance with user preference criteria. The user preferences may take many different forms, but may include time/date restrictions or category restrictions. For example, a selection based on information selected by rating criteria in step 210 and user preference criteria in step 220 could be "all articles posted on Tuesday regarding sports cars and having a rating higher than fifty."

Figure 3:
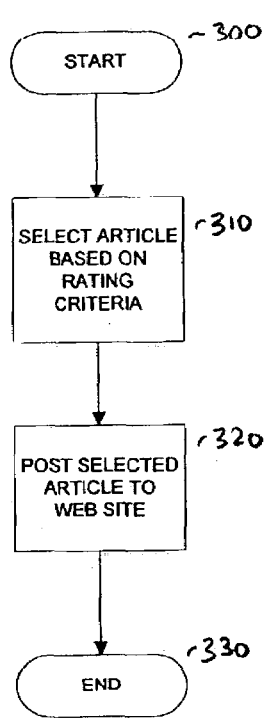
FIG. 3 is a flowchart of a portion of the system related to selecting an article based on rating criteria and then posting that article to a Web site in accordance with one embodiment of the present invention.

FIG. 3 illustrates a method for selecting and posting information according to a preferred embodiment of the present invention. As shown in FIG. 3, an article is selected based on certain rating criteria in step 310. For example, if the ratings of the articles range from 0 to 10, the selection criteria could be "all articles with a rating higher than 5." The articles selected in step 310 are then displayed on a Web site in step 320.

Figure 4:
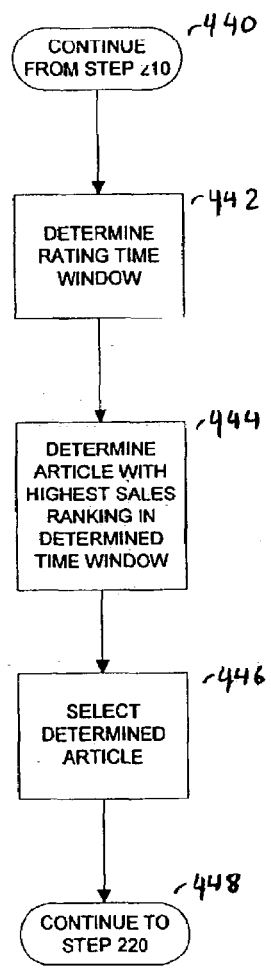
FIG. 4 is a flowchart further detailing a portion of the system related to the selection of an article to post to a Web site based on sales information within a predetermined time period, in accordance with one embodiment of the present invention.

FIG. 4 further details one possible embodiment of the present invention. FIG. 4 illustrates a method for selecting information based on rating criteria within a certain period of time. In step 442, the rating time window is selected. Since the articles posted on the system may be news articles which lose their relevance over time, an optional time preference is offered to the user seeking information from the system. For example, the relevant time period may be "all articles posted since 8:00 am this morning." In step 444, the system locates the article with the highest rating in that specified time period. In one embodiment of the present invention, the rating of the article is based on the number of users who have purchased that article. In another embodiment of the present invention, the rating of the article is based on data provided by users who have purchased that article. After finding the highest-rated article within the specified time period in step 444, the system selects that article in step 446 and proceeds to post that article to a Web site in step 320 of FIG. 3.

Figure 5:
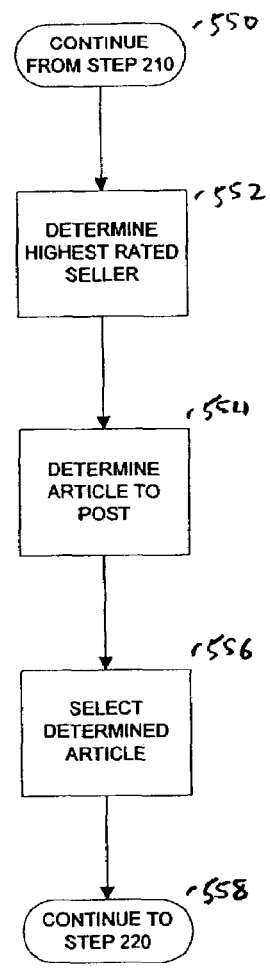
FIG. 5 is a flowchart detailing a procedure of the system for distributing articles related to determining and selecting an article to post to the Web site based on the identity of the highest-rated selling user of the system, in accordance with one embodiment of the present invention.

FIG. 5 details another embodiment of the present invention: a method for selecting information based on rating criteria for a specific seller. In step 552, the system determines which information-selling user has the highest rating. As described above, the seller rating may be based upon the number of users purchasing information from that seller, or may be based upon data provided by users who have purchased information from that seller; both embodiments are practicable within the principles of the present invention. After determining the highest-rated information-selling user in step 554, the system determines which of that user's articles to select. In one embodiment of the present invention, the article chosen is the highest-rated article submitted by that user. In another embodiment of the present invention, the article is chosen randomly from the list of articles submitted by that user. In yet another embodiment of the present invention, the article chosen is the most recent article submitted by that user. After determining which of the highest-rated seller's articles to post in step 554, the system selects that article for posting in step 556 and posts that article to a Web site as in step 320 of FIG. 3.

Figure 6:
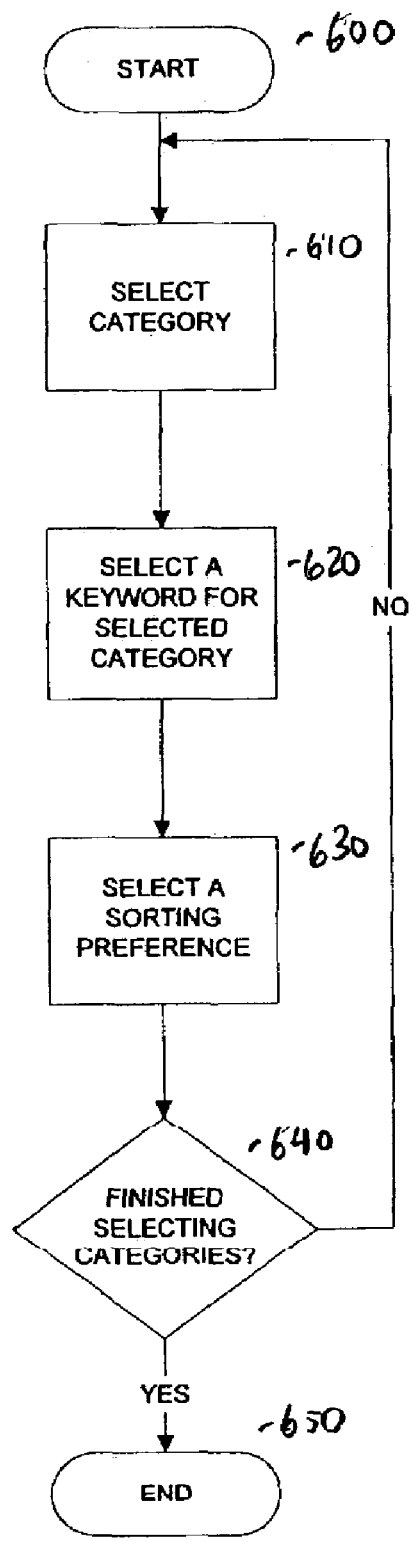
FIG. 6 is a flowchart detailing a search feature of the system and method for distributing a plurality of electronic articles, illustrating a procedure in which information-seeking users of the system may search for articles on the system, in accordance with one embodiment of the present invention.

FIG. 6 illustrates a method for receiving search criteria from a user in accordance with the present invention. A user selects a category of information in which a search should be performed in step 610. For example, the user may specify a search within the category "sports news" or "recipes" or "funny short stories". In one embodiment of the present invention, the user may optionally enter a category in which searches may be performed. In another embodiment of the present invention, a user must select a category in which to search. In yet another embodiment of the present invention, the user may select multiple categories in which to search.

After optionally selecting the category of desired information in step 610, the system allows the user to optionally enter a textual search phrase in step 620. For example, if the user wishes to search for short stories about basketball, the user could select the category "short stories" in step 610 and then in step 620 could further refine the search by entering the phrase "basketball" into a provided text entry interface. The textual search phrase may be either optional or mandatory; the principles of the present invention may be practiced in either embodiment. The system allows the user to optionally select a sorting preference in step 630. For example, the articles meeting the specified search criteria may be sorted by date or by price.

FIG. 7 illustrates a Web site 700 in accordance with the principles of the present invention, in which the content of the Web site is "dynamic" in the sense that it is generated based on the articles in the system. For example, the title 710 of the highest-rated article on the system may be displayed on the Web site 700, and may include the name of the author 720. The Web site 700 may also include the date and time at which an article was posted 730 in the article summaries. As described above, articles will typically be associated with a summary of the content of the article 780, which may be displayed on the Web site 700. As illustrated in FIG. 7, the titles 710 of the articles may be displayed as arranged by type 770. For example, the Web site 700 may list the most recently posted articles, or may list the top-ranked articles within each of several types 770. Additionally, the Web site 700 may list the ratings 740, 750, 760 associated with the articles. As shown in FIG. 7, the rating of an article may be based on one or more of three types of calculations. The rating could be based on the average rating 740 users of the system have assigned to the article, or could be based on the number of users 750 who have purchased the article, or could be based on the number of positive comments 760 which have been recorded by users about the article; the principles of the present invention are practicable in all three embodiments.

Figure 8:
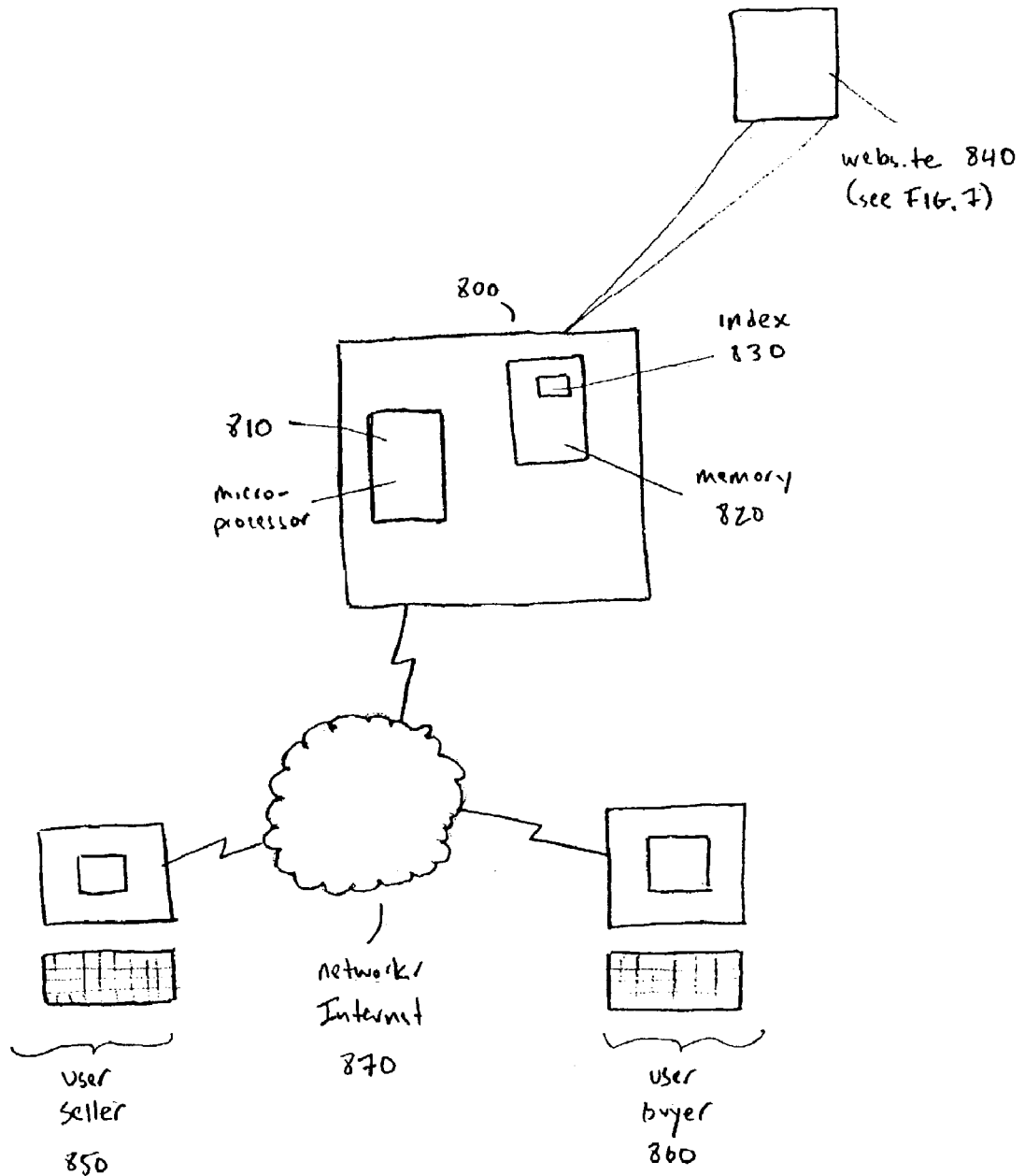
FIG. 8 is an illustration of the components of a system for distributing a plurality of electronic articles, detailing the interaction and communication between the components of the system in accordance with one embodiment of the present invention.

FIG. 8 illustrates the components of a system for the distribution of a plurality of electronic articles. A computer server 800 comprises a micro-processor 810 and a memory 820 in communication with the micro-processor 810. The processor 810 is a hardware device for executing software, particularly software stored in memory 820. The processor 810 can be any custom-made or commercially-available processor, a central processing unit (CPU), an auxiliary processor among several processors associated with the computer server 800, a semiconductor-based microprocessor (in the form of a microchip or chip set), a macroprocessor, or generally any device from Hewlett-Packard Company, an 80×8 or Pentium-series microprocessor from Intel Corporation, a PowerPC microprocessor from IBM, a Sparc microprocessor from Sun Microsystems, Inc., or an 8-series microprocessor from Motorola Corporation.

The memory 820 can include any one or a combination of volatile memory elements (e.g., a random access memory (RAM, such as DRAM, SRAM, SDRAM, etc.) and non-volatile memory elements (e.g., ROM, hard drive, tape, CDROM, etc.). Moreover, memory 820 may incorporate electronic, magnetic, optical, and/or other types of storage media. The memory 820 can have a distributed architecture where various components are situated remote from one another, but can be accessed by the processor 810.

The memory may comprise an index 830 to enable searching of the articles stored in the memory 820. A user 850 may post articles to the server 800 via a communications network 870 such as the Internet. Articles stored in memory 820 are accessible to a user 860 searching for and purchasing articles. The interface for both the selling user 850 and the buying user 860 is a Web site 840, which may have a different interface for the different types of users 850 and 860. One skilled in the art will appreciate the wide variety of computer hardware which may operate as a computer server 800 in accordance with the present invention. One skilled in the art will also appreciate the wide variety of computer hardware which may operate as a computer user 850 and 860. The Web site 840 is viewable by the users 850 and 860 across multiple types of computer hardware and software systems equipped with "browser" software such as the commercially-available programs Microsoft Internet Explorer, Netscape, Mozilla, Mosaic, and Opera.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

What is claimed is:

1. A method for distributing a plurality of digital article files for a price within a micro-price range, comprising the steps of:

providing for receiving at a central computer first author information from a first client computer for establishing a first author account associated with and utilizing the first author information, the first author account having a first author account value, and the first author account having a first author identifier for at least logging into the central computer from the first client computer;

providing for receiving at the central computer a first digital article file from the first client computer, the first digital article file comprising a first digital article, wherein the first digital article file is associated with the first author identifier;

providing for receiving at the central computer a first digital article micro-price within the micro-price range from the first client computer for establishing a first price to charge buyers for the first digital article;

providing for storing the first digital article file in a memory associated with the central computer, the first digital article file being retrievable from the memory;

providing for receiving at the central computer second author information from a second client computer for establishing a second author account associated with and utilizing the second author information, the second author account having a second author account value, and the second author account having a second author identifier for at least logging into the central computer from the second client computer;

providing for receiving at the central computer a second digital article file from the second client computer, the second digital article file comprising a second digital article, wherein the second digital article file is associated with the second author identifier;

providing for receiving at the central computer a second digital article micro-price within the micro-price range from the second client computer for establishing a second price to charge buyers for the second digital article;

providing for storing the second digital article file in a memory associated with the central computer, the second digital article file being retrievable from the memory;

providing for receiving at the central computer first buyer information from a third client computer for establishing a first buyer account associated with and utilizing the first buyer information, the first buyer account having a first buyer account value, and the first buyer account having a first buyer identifier for at least logging into the central computer from the third client computer;

providing for receiving at the central computer a first buyer payment for increasing the first buyer account value from the third client computer;

providing for receiving at the central computer a request for the purchase of the first digital article file from the third client computer;

providing for debiting the first buyer account by decreasing the first buyer account value an amount relating to the first digital article micro-price;

providing for crediting the first author account by increasing the first author account value an amount relating to the first digital article micro-price;

providing for transmitting the first digital article file to the third client computer in response to the request for the purchase of the first digital;

providing for receiving at the central computer second buyer information from a fourth client computer for establishing a second buyer account associated with and utilizing the second buyer information, the second buyer account having a second buyer account value, and the second buyer account having a second buyer identifier for at least logging into the central computer from the fourth client computer;

providing for receiving at the central computer a second buyer payment for increasing the second buyer account value from the fourth client computer;

providing for receiving at the central computer a request for the purchase of the second digital article from the fourth client computer;

providing for debiting the second buyer account by decreasing the second buyer account value an amount relating to the second digital article micro-price;

providing for crediting the second author account by increasing the second author account value an amount relating to the second digital article micro-price; and, providing for transmitting the second digital article file to the fourth client computer in response to the request for the purchase of the second digital article.

2. The method of claim 1, wherein the memory comprises an index of the digital article files stored in the memory.

3. The method of claim 2, further comprising the step of:
providing for searching the index to locate one of the digital article files based on at least one of type, subject matter, author name, submitter name, title, date, and/or rating.

4. The method of claim 1, further comprising the step of:
providing for receiving a revised version of one of the digital article files from one of the plurality of users.

5. The method of claim 1, wherein the steps of providing for receiving the first and second digital article files comprises the step of:
providing for receiving a summary of the first and second digital article files from first and second authors of the first and second digital articles, respectively.

6. The method of claim 1, further comprising the step of:
providing for generating a summary of the first and second digital article files.

7. The method of claim 1, further comprising the step of:
providing for classifying each of the first and second digital article files received from first and second authors, respectively, based on at least one of type, subject matter, submitter name, title, author name, date, and/or rating.

8. The method of claim 7, wherein the step of classifying comprises:
providing for determining the type of the first and second digital article files.

9. The method of claim 7, further comprising the step of:
providing for transmitting summaries of the first and second digital article files to first and second users, respectively, the summaries sorted by at least one of type, subject matter, submitter name, title, author name, date, and/or rating.

10. The method of claim 7, further comprising the step of:
providing for establishing the price of the first and second digital article files.

11. The method of claim 10, further comprising the step of:
providing for allowing the price of the first and second digital article files to only be set within a predefined micro-price range by an author and/or submitter.

12. The method of claim 10, wherein the step of providing for establishing the price of the first and second digital article files comprises the step of:
providing for determining the price based on at least length, date, author, subject matter, and/or type.

13. The method of claim 1, further comprising the step of:
providing for preventing the purchase of the first and second digital article files by the first and/or second buyers if the first and/or second buyers, respectively, does not have an established electronic funding account.

14. The method claim 1, wherein the step of providing for transmitting the first and second digital article files to the first and second buyers, respectively, each comprises providing for at least displaying the first and second digital article files on a Web site, electronically mailing the first and second digital article files, and/or providing the first and second digital article files for download.

15. The method of claim 1, further comprising the step of:
providing for notifying the first and second authors of the first and second digital article files, respectively, that the first and second digital article files, respectively, have been purchased.

16. The method of claim 15, wherein the step of providing for notifying comprises providing for at least displaying purchase information on a Web site and/or electronically mailing purchase information to the first and second buyers.

17. The method of claim 1, wherein each of the first and second digital article files has at least one of a type, a subject matter, an author name, a submitter name, a title, and/or a date, further comprising the step of:
providing for ranking the first and second digital article files according to at least one of type, subject matter, author name, submitter name, title, and/or date.

18. The method of claim 1, further comprising the steps of
providing for calculating a first rating for the first digital article file based on the number of times the first digital article file has been purchased; and,
providing for calculating a second rating for the second digital article file based on the number of times the second digital article file has been purchased.

19. The method of claim 18, wherein the steps of providing for calculating the first and second ratings are each based on buyer ratings received from a plurality of buyers.

* * * * *